(12) United States Patent
Choi et al.

(10) Patent No.: US 6,268,430 B1
(45) Date of Patent: Jul. 31, 2001

(54) IONOMERS AND IONICALLY CONDUCTIVE COMPOSITIONS

(75) Inventors: Susan Kuharcik Choi, Downingtown, PA (US); Christopher Marc Doyle, Newark, DE (US); Mark Gerrit Roelofs; Lin Wang, both of Hockessin, DE (US); Zhen-Yu Yang, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/588,885

(22) Filed: Jun. 7, 2000

Related U.S. Application Data

(62) Division of application No. 09/061,132, filed on Apr. 16, 1998, now Pat. No. 6,100,324.

(51) Int. Cl.[7] ............... C08L 27/12; C08L 51/06; C25B 11/04
(52) U.S. Cl. ............ 524/544; 524/108; 524/504; 525/69; 525/250; 528/491; 204/280; 204/291; 204/660
(58) Field of Search ............... 524/108, 544, 524/504; 525/250, 69; 528/491; 204/280, 660, 291

(56) References Cited

U.S. PATENT DOCUMENTS

| | | | |
|---|---|---|---|
| 3,282,875 | 11/1966 | Connolly et al. | 260/29.6 |
| 4,358,545 | 11/1982 | Ezzell et al. | 521/27 |
| 4,384,941 | * 5/1983 | Okamoto et al. | 204/129 |
| 5,627,292 | 5/1997 | Armand et al. | 549/555 |
| 5,633,098 | 5/1997 | Narang et al. | 429/104 |
| 5,798,417 | * 8/1998 | Howard, Jr. | 525/276 |
| 6,100,324 | * 8/2000 | Choi et al. | 524/493 |

FOREIGN PATENT DOCUMENTS

WO 96/23010  8/1996  (WO).

OTHER PUBLICATIONS

LeNest et al., *Polymer Communications*, 28, 303, 1987.
Fauteux et al., *Electrochimica Acta*, 40, 2185, 1995.
Benrabah et al., *Electrochimica Acta*, 40, 2259, 1995.
Desmarteau et al., *Journal of Fluorine Chemistry*, 52, 7–12, 1991.
Turowsky et al., *Inorg. Chem.*, 27, 2135–2137, 1988.

* cited by examiner

*Primary Examiner*—Tae H. Yoon

(57) ABSTRACT

Disclosed are ionomers comprising functionalized polyolefins having fluoroalkyl sulfonate pendant groups and ionically conductive compositions formed therefrom by the addition of solvents.

16 Claims, No Drawings

IONOMERS AND IONICALLY CONDUCTIVE COMPOSITIONS

This application is a divisional application of Ser. No. 09/061,132, filed on Apr. 16, 1998, now U.S. Pat. No. 6,100,324.

FIELD OF THE INVENTION

This invention relates to ionomers comprising functionalized polyolefins having fluoroalkyl sulfonate pendant groups and to ionically conductive compositions formed therefrom by the addition of solvents thereto. The ionically conductive compositions of the invention are useful in batteries, fuel cells, electrolysis cells, ion exchange membranes, sensors, electrochemical capacitors, and modified electrodes.

TECHNICAL BACKGROUND OF THE INVENTION

It has long been known in the art to form ionically conducting membranes and gels from organic polymers containing ionic pendant groups. Such polymers are known as ionomers. Particularly well-known ionomer membranes in widespread commercial use are Nafion™ Membranes available from E. I. du Pont de Nemours and Company. Nafion™ is formed by copolymerizing tetra-fluoro ethylene (TFE) with perfluoro(3,6-dioxa-4-methyl-7-octenesulfonyl fluoride), as disclosed in U.S. Pat. No. 3,282,875. Also known are copolymers of TFE with perfluoro (3-oxa-4-pentene sulfonyl fluoride), as disclosed in U.S. Pat. No. 4,358,545. The copolymers so formed are converted to the ionomeric form by hydrolysis, typically by exposure to an appropriate aqueous base, as disclosed in U.S. Pat. No. 3,282,875. Lithium, sodium and potassium are all well known in the art as suitable cations for the above cited ionomers.

In the polymers above-cited, the fluorine atoms provide more than one benefit. The fluorine groups on the carbons proximate to the sulfonyl group in the pendant side chain provide the electronegativity to render the cation sufficiently labile so as to provide high ionic conductivity. Replacement of those fluorine atoms with hydrogen results in a considerable reduction in ionic mobility and consequent loss of conductivity.

The remainder of the fluorine atoms afford the chemical and thermal stability to the polymer normally associated with fluorinated polymers. This has proven to be of considerable value in such applications as the well-known "chlor-alkali" process. However, highly fluorinated polymers also have disadvantages where there is less need for high chemical and thermal stability. The fluorinated monomers are more expensive than their olefin counterparts, require higher processing temperatures, and often require expensive corrosion resistant processing equipment. Furthermore, it is difficult to form solutions and dispersions of fluoropolymers. Additionally, it is difficult to form strong adhesive bonds with fluoropolymers. In materials employed in electrochemical cells, for example, it may be advantageous to have better processibility at some cost to chemical and thermal stability. Thus, there is an incentive to develop ionomers with highly labile cations having non-fluorinated polymer backbones.

Numerous publications disclose polyethers with either proximal ionic species in the polymer or in combination with ionic salts. Conductivities are in the range of $10^5$ S/cm and less. Le Nest et al., Polymer Communications 28, 303 (1987) disclose a composition of polyether glycol oligomers joined by phosphate or thiophosphate moieties hydrolyzed to the related lithium ionomer. In combination with propylene carbonate, conductivity in the range of $1\times10\times10^{-4}$ S/cm was realized. A review of the related art is found in Fauteux et al., Electrochimica Acta 40, 2185 (1995).

Benrabah et al, Electrochimica Acta, 40 2259 (1995) disclose polyethers crosslinked by lithium oxytetrafluorosulfonates and derivatives. No aprotic solvents are incorporated. With the addition of lithium salts conductivity of $<10^{-4}$ S/cm was achieved.

Armand et al., U.S. Pat. No. 5,627,292 disclose copolymers formed from vinyl fluoroethoxy sulfonyl fluorides or cyclic ethers having fluoroethoxy sulfonyl fluoride groups with polyethylene oxide, acrylonitrile, pyridine and other monomers. Lithium sulfonate ionomers are formed. No aprotic solvents are incorporated. Conductivity was <104 S/cm.

Narang et al., U.S. Pat. No. 5,633,098 disclose polyacrylate copolymers having a functionalized polyolefin backbone and pendant groups containing tetrafluoroethoxy lithium sulfonate groups. The comonomers containing the sulfonate groups are present in molar ratios of 50–100%. Compositions are disclosed comprising the polymer and a solvent mixture consisting of propylene carbonate, ethylene carbonate, and dimethoxyethane ethyl ether. Ionic conductivity of those compositions was in the range of $10^{-4}$–$10^{-3}$ S/cm.

Brookhart et al., WO 9623010A2, discloses a copolymer formed from ethene and 1,1,2,2-tetrafluoro-2-[(1,1,2,2,3,3,4,4-octafluoro-9-decenyl)oxy] ethanesulfonyl fluoride via a catalyzed reaction employing diimine-transition metal complexes. The polymer so-formed comprises a polyethylene backbone having randomly distributed pendant groups of 1,1,2,2-tetrafluoro-2-[(1,1,2,2,3,3,4,4-octafluoro-(mostly) octoxy] ethanesulfonyl fluoride, as well as alkyl branches.

SUMMARY OF THE INVENTION

This invention provides for an ionomer comprising a backbone and pendant groups, the backbone consisting essentially of methylene units and the pendant groups comprising ionic radicals of the formula

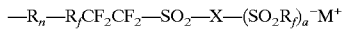

where $M^+$ is a univalent metal cation; the $R_f$ groups are independently selected from the group consisting of linear or branched perfluoroalkylene radicals, perfluoroalkylene radicals containing O or Cl, and perfluoroaryl radicals; R is hydrocarbyl where n=0 or 1; a=0–2; and X=O, N or C; said ionic radicals being further limited in that a=0 when X=O, a=1 when X=N, and a=2 when X=C.

This invention further provides for an ionically conductive composition comprising said ionomer described above and a liquid imbibed therewithin.

This invention also discloses a process for forming an ionomer, the process comprising contacting a polyolefin comprising a backbone and pendant groups, the backbone consisting essentially of methylene and methine units and the pendant groups comprising ionic radicals of the formula

where X is F or Cl, $R_f$ is a linear or branched perfluoroalkylene, perfluoroalkylene containing O or Cl, or perfluoroaryl radical, and R is hydrocarbyl where n=0 or 1, with a solution of an alkali metal base.

Further disclosed is a process for forming a conductive composition the process comprising contacting the above ionomer with a liquid.

Also included herein is an electrode comprising at least one electrode active material, the ionomer disclosed herein mixed therewith, and a liquid imbibed therewithin.

Further disclosed is an electrochemical cell comprising a positive electrode, a negative electrode, a separator disposed between the positive and negative electrodes, and a means for connecting the cell to an outside load or source wherein at least one of the group consisting of the separator, the cathode, and the anode, comprises the above ionomer.

DETAILED DESCRIPTION

In a preferred embodiment of the polyolefin ionomer of the invention, the backbone consists essentially of olefinic radicals whereof 1–20 mol-% have pendant groups in the form of a radical of the formula $$M^+ {}^-SO_3-CF_2CF_2-O-[(CFR_1CF_2)_x-O_y]_n-(CH_2)_z- \quad (I)$$

where $M^+$ is an alkali metal cation, $R_1$ is perfluoroalkyl or fluorine, x=0,1,2, or 3, y=0 or 1, n=0,1,2, or 3, and z is an integer in the range of 2 to 6. Most preferably $M^+$ is a lithium cation, $R_1$ is fluorine, x=1, y=0, n=1 or 2, z=4.

The olefinic radicals making up the backbone of the polyolefin ionomer of the invention are substantially unsubstituted except that 1–20 mol-% of the olefinic radicals of the backbone in a preferred embodiment of the invention have a pendant group in the form of the radical (I). In a most preferred embodiment, 2–10 mol-% of the olefinic radicals of the backbone have a pendant group in the form of the radical (I).

As is known in the art, the degree and type of branching in a polyolefin depends upon the monomers employed in the polymerization and the method by which the polymerization is achieved. Ethylene polymerized by various catalytic methods exhibits short chain branches at a frequency of <1 to ca. 150 per 1000 methylene groups in the backbone depending upon the catalyst employed and reaction conditions. The short chain branches so formed are mostly methyl or ethyl groups.

When the olefin monomer polymerized is higher than ethylene, the number of branches increases considerably, since there is then at least one side chain inherent in each monomer unit.

It is found in the practice that chain branching has a significant effect on the ionic conductivity of the conductive compositions of the present invention. In order to achieve the highest conductivity, branching frequency of 5–90 methyl branches per 1000 methylenes is preferred when the ionomer of the invention is produced from polymers synthesized by the catalytic routes herein described. A greater degree of branching appears to be tolerable when the ionomer is made by the graft polymer route hereinbelow described.

The preferred ionomers of the invention are conveniently produced according to methods known in the art, by contacting a non-ionic sulfonyl halide precursor with a solution of an alkali metal hydroxide thereby hydrolyzing the polymer to the alkali metal salt. It is found in the practice of the invention, that the acid form of the ionomer of the invention is most easily produced by first subjecting the non-ionic precursor to a solution of an alkali metal hydroxide followed by ion-exchange with an aqueous acid. Other univalent metals, such as copper or silver, can be exchanged for the alkali metal ion by methods of ion exchange known in the art.

The precursor polymers preferred for the practice of the invention can be formed by copolymerization of one or more olefins, preferably ethylene, and a substituted olefin comonomer preferably of the formula $$FSO_2-CF_2CF_2-O-[(CFR_1CF_2)_x-O_y]_n-(CH_2)_z-CH=CH_2$$

where $R_1$ is perfluoroalkyl or fluorine, x=0,1,2, or 3, y=0 or 1, n=0,1,2, or 3 and z is an integer in the range of 2 to 6. Most preferably, $R_1$ is fluorine, x=1, y=0, n=I or 2, and z=4. Such copolymerizations are known in the art, and are readily achievable using known catalytic methods such as that in Brookhart et al, WO9623010A2, and as hereinbelow shown.

Diimine-transition metal complexes as disclosed by Brookhart, and as hereinbelow exemplified, are preferred catalysts for forming the non-ionic precursor polymers preferred for the process of the invention. In the polymer so-formed, the backbone consists essentially of olefinic radicals whereof 1–20 mol-%, preferably 2–10 mol-%, have pendant groups of 1,1,2,2-tetrafluoro-2-[(1,1,2,2,3,3,4,4-octafluoro-(mostly)octoxy] ethanesulfonyl fluoride, the polymer having fewer than 150, preferably 5–90, alkyl, mostly methyl and ethyl, branches per 1000 methylenes. Catalyst structure has a determining effect on number of chain branches. Other catalysts suitable for the practice of the invention include metallocene and Ziegler-Natta catalysts. The most preferred catalysts are the nickel diimine catalysts represented by the structures B and D in Table 2 hereinbelow in combination with PMAO. These catalysts offer a desirable combination of good rates of comonomer incorporation, branching levels in the preferred range all with high polymer yield.

In the case of the preferred diimine nickel catalysts, it has been found in the practice of the present invention that a higher degree of polymer branching results from the use of bulkier catalysts. Less bulky catalysts are associated with higher incorporation of the sulfonyl-containing substituted olefin comonomer.

The degree of branching achieved in metallocene catalyzed copolymerizations (see, for example, Yang et al, J.Am. Chem. Soc. 116, pp. 10015ff, 1994) of the preferred comonomers of the invention is generally low with concomitant lower conductivity. However, use of a termonomer, preferably an olefin having three or more carbons in the chain, in combination with a metallocene or Ziegler-Natta catalyst can increase the degree of branching in the resulting polymer with higher resulting ionic conductivity.

Other means are also suitable for forming the ionomers of the invention. These include forming the ionomer of the present invention by grafting to a substantially unsubstituted polyolefin, preferably polyethylene, a radical of the formula $$FSO_2-CF_2CF_2-O-[(CFR_1CF_2)_x-O_y]_n-(CH_2)_z-$$

where $R_1$ is perfluoroalkyl or fluorine, x=0,1,2, or 3, y=0 or 1, n=0,1,2, or 3 and z is an integer in the range of 2 to 6, is grafted to polyethylene. Preferably, $R_1$ is fluorine, x=1, y=0, n=1, and z=2. Numerous methods of grafting onto polyolefins are known in the art. One method found to be suitable is hereinbelow exemplified.

In another embodiment a polymer having a backbone consisting essentially of olefinic radicals whereof 1–20 mol-% have pendant groups in the form of a radical of the formula $$XSO_2-CF_2CF_2-R_f-R_n-$$

where X is F or Cl, $R_f$ is a linear or branched perfluoroalkylene, perfluoroalkylene containing O or Cl, or perfluoroaryl radical, and R is hydrocarbyl where n=0 or 1, is reacted with

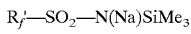

according to the methods taught by Desmarteau, in J. Fluorine Chem., 52, pp. 7ff, 1991. The resulting polymer has a backbone of substantially unsubstituted olefinic radicals whereof 1–20 mol-% have pendant groups in the form of a radical of the formula

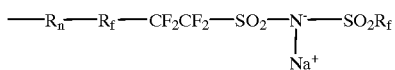

where the $R_f$ groups are linear or branched perfluoroalkylene, perfluoroalkylene containing O or Cl, or perfluoroaryl radical, and need not all be the same, R is hydrocarbyl where n=0 or 1. The sodium ion can be replaced by eg. lithium ion by simple cation exchange procedures known in the art.

In yet another embodiment, a polymer having a backbone consisting essentially of olefinic radicals whereof 1–20 mol-% have pendant groups in the form of a radical of the formula $$XSO_2\text{—}CF_2CF_2\text{—}R_f\text{—}R_n\text{—}$$

where X is F or Cl, $R_f$ is a linear or branched perfluoroalkylene, perfluoroalkylene containing O or Cl, or perfluoroaryl radical, and R is hydrocarbyl where n=0 or 1, is reacted with

prepared by the method of Seppelt, Inorg. Chem. 27. pp. 2135 ff, 1988, by combining in THF solution and stirring at room temperature overnight, followed by solvent removal and treatment with aqueous HCl for several hours. The solution is then filtered, washed in water, and then treated with a solution of alkali metal base. The resulting polymer has a backbone of substantially unsubstituted olefinic radicals whereof 1–20 mol-% have pendant groups in the form of a radical of the formula

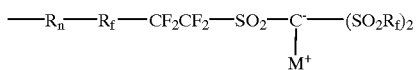

where $M^+$ is an alkali metal, the $R_f$ groups are linear or branched perfluoroalkylene, perfluoroalkylene containing O or Cl, or perfluoroaryl radical, and need not all be the same, R is hydrocarbyl where n=0 or 1.

It has been found in the practice of the invention that the degree of comonomer incorporation has a profoundly non-linear effect on the conductivity of the conductive compositions of the invention. For comonomer concentrations below ca. 2 mol-%, conductivity ranges from 0 to ca. $10^{-5}$ S/cm, almost independent of the degree of branching or the liquid employed. Conductive compositions exhibiting conductivity of $10^{-5}$ S/cm or less are of relatively limited utility.

At comonomer incorporation of ca. 2–3 mol-%, ionic conductivity increases considerably, exhibiting strong dependence upon branching and the choice of liquids employed for forming the conductive composition. In the range of ca. 3–10 mol-% conductivities in the range of $10^{-5}$ to $10^{-2}$ S/cm are achieved while a moderate dependence upon comonomer concentration is observed. Little additional benefit is obtained at comonomer concentrations of ca. 10 mol-% versus ca. 6–7 mol-%. It is believed by the inventors that one reason for this "diminishing returns" effect is that the catalysts required to achieve higher comonomer incorporation into the polymer also produce less-branched polymer so that the two effects are somewhat self-cancelling. Nevertheless, conductivity well above $10^{-5}$ S/cm is observed in conductive compositions of the invention wherein propylene carbonate is employed as the liquid, at comonomer concentrations in the polymer of less than 10 mol-%, in stark contrast to the teachings of the art.

In a preferred embodiment of the present invention, the ionic functionality is present in the ionomer preferably at a concentration of 1–10 mol-%, most preferably 3–7 mol-%.

While there is no limit to the shape or proportions of an article formed from the ionomers of the invention, thin films or membranes are of particular utility. The ionomers of the invention are not fully thermoplastic and are not as readily processible as the non-ionic precursor polymers from which they derive. Thus it is found convenient to form membranes of the precursor polymers by methods generally known in the art and as hereinbelow described. It is particularly convenient to extrude films using a screw extruder and a flat die. Alternatively, films can be melt pressed. And, in an additional alternative, films may be cast from solutions or dispersions of the precursor polymers by casting onto a substrate and coagulating. No particular method is preferred over another, and the specific method will be chosen according to the needs of the particular practitioner.

The ionomers of the present invention exhibit room temperature ionic conductivity of ca. $10^{-7}$–$10^{-6}$ S/cm when dry. However, it is found in the practice of the invention that numerous liquids when imbibed into the ionomer of the invention enhance the conductivity by orders of magnitude. Thus it has been found desirable in order to achieve the most useful embodiments of the present invention to form conductive compositions wherein liquids are imbibed into the ionomer of the invention.

The liquid employed will be dictated by the application. In general terms, it has been found in the practice of the invention that conductivity of the liquid-containing ionomer increases with increasing % weight uptake, increasing dielectric constant, and increasing Lewis basicity of the liquid, while conductivity has been observed to decrease with increasing viscosity and increasing molecular size of the liquid employed. Thus, a highly basic solvent of low viscosity and small molecular size but low dielectric constant may provide superior conductivity in a given membrane than a larger, more viscous, less basic solvent of very high dielectric constant. Of course, other considerations come into play as well. For example, excessive solubility of the ionomer in the liquid may be undesirable. Or, the liquid may be electrochemically unstable in the intended use.

One particularly preferred embodiment comprises the lithium ionomer combined with aprotic solvents, preferably organic carbonates, which are useful in lithium batteries.

The preferred electrode of the invention comprises a mixture of one or more electrode active materials in particulate form, the ionomer of the invention, at least one electron conductive additive, and at least one organic carbonate. Examples of useful anode active materials include, but are not limited to, carbon (graphitic, coke-type, mesocarbons, polyacenes, and the like) and lithium-intercalated carbon, lithium metal nitrides such as $Li_{2.6}Co_{0.4}N$, tin oxide, based glasses, lithium metal, and lithium alloys, such as alloys of lithium with aluminum, tin, magnesium, silicon, tin, manganese, iron, and zinc. Lithium intercalation anodes employing carbon are preferred. Useful cathode active materials include, but are not limited to, transition metal oxides and sulfides, lithiated transition metal oxides and sulfides, and organosulfur compounds. Examples of such are cobalt oxides, manganese oxides, molybdenum oxides, vanadium oxides, sulfides of titanium, molybdenum and niobium, lithiated oxides such as spinel lithium manganese oxides $Li_{1+x}Mn_{2-x}O_4$, chromium-doped spinel lithium manganese oxides $Li_xCr_yMn_zO_4$, $LiCoO_2$, $LiNiO_2$, $LiNi_xCo_{1-x}O_2$ where x is 0<x<1, with a preferred range of 0.5<x<0.95, $LiCoVO_4$, and mixtures thereof. $LiNi_xCo_{1-x}O_2$ is preferred. A highly preferred electron conductive aid is carbon black, preferably Super P carbon black, available from the MMM S.A. Carbon, Brussels, Belgium, in the concentration range of 1–10%. Preferably, the volume fraction of the lithium ionomer in the finished electrode is between 4 and 40%.

The electrode of the invention may conveniently be made by dissolution of all polymeric components into a common solvent and mixing together with the carbon black particles and electrode active particles. For cathodes the preferred electrode active material is $LiNi_xCo_{1-x}O_2$ wherein 0<x<1, while for anodes the preferred electrode active material is graphitized mesocarbon microbeads. For example, a preferred lithium battery electrode of the invention can be fabricated by dissolving ionomer of the invention in a mixture of acetone and dimethylformamide, followed by addition of particles of electrode active material and carbon black, followed by deposition of a film on a substrate and drying. The resultant preferred electrode will comprise electrode active material, conductive carbon black, and ionomer of the invention, where, preferably, the weight ratio of ionomer to electrode active material is between 0.05 and 0.8 and the weight ratio of carbon black to electrode active material is between 0.01 and 0.2. Most preferably the weight ratio of ionomer to electrode active material is between 0.1 and 0.25 and the weight ratio of carbon black to electrode active material is between 0.02 and 0.1. This electrode can then be cast from solution onto a suitable support such as a glass plate or current collector metal foil, and formed into a film using techniques well-known in the art. The electrode film thus produced can then be incorporated into a multi-layer electrochemical cell structure by lamination, as hereinbelow described.

It may be desirable to incorporate into the electrode composition of the invention such adjuvants as may be useful for such purposes as improving the binding of the components thereof, or providing improved structural integrity of an article fabricated therefrom. One particularly preferred additional material is $SiO_2$ which may be incorporated simply by dispersing the particles thereof into the same solution from which the electrode is being formed, as hereinabove described. Preferred are silica particles of an average particle dimension of less than 1.0 micrometers, the silica being present in the admixture at up to 50% by weight of the total.

In an alternative process, the dispersion of electrode-active material and optional carbon black and other adjuvants can first be cast onto a surface followed by addition of the ionomer of the invention in organic carbonate solution.

The invention is further described in the following specific embodiments.

EXAMPLES

Precursor non-ionic polymers I–XIV hereinbelow described, were formed by copolymerization of ethylene with a comonomer of the formula

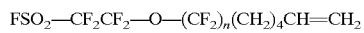

where n=2 or 4. The solvent employed was toluene, except in the case of the synthesis of Polymer XI wherein it was dichloromethane.

Referring to Table 1, polymers I–X were synthesized by combining in a Schlenk flask in a nitrogen purged drybox, the indicated amounts of the indicated catalyst, comonomer, and solvent. The structure of the designated catalyst is provided in Table 2. The mixture was then brought out of the dry box and placed under 1 atmosphere of ethylene. The mixture was purged with ethylene for 15 minutes while cooling by immersion in an ice water bath. 2.2 ml of a 7.1% solution of polymethylalumoxane (PMAO) in toluene was then introduced to initiate the reaction, and the mixture was agitated for the indicated time. At the end of the indicated time, 5 ml of methanol was slowly added to the reaction mixture, after which the mixture was decanted into 150 ml of methanol, followed by addition of 1.5 ml of concentrated aqueous HCl. The resulting mixture was stirred for ca. 30 minutes. The resulting white solid polymer was filtered, washed with six 20 ml aliquots of methanol, and dried in vacuo.

Polymer XI was synthesized by combining the indicated amounts of the indicated catalyst, comonomer and dichloromethane solvent in a Schlenk flask. Reaction was initiated by placing the mixture under 1 atmosphere of ethylene at room temperature; no PMAO was added. Reaction proceeded for 4,260 minutes under agitation. The resulting polymer was an oily liquid. The reaction was filtered. To the filtrate was added 350 ml of methanol with agitation. An oil precipitate was isolated and redissolved in 100 ml of dichloromethne followed by addition of 350 ml of methanol. A light yellow oil product was isolated and dried in vacuo. The material so-produced exhibited a glass transition temperature of −66° C. and no melting point.

Polymers XII and XIII were produced by combining in a Schlenk flask in a drybox the indicated amounts of the indicated catalyst, comonomer, and solvent. The mixture was placed under 1 atmosphere of ethylene and purged with ethylene for 15 minutes. 10 ml of a 7.1% solution of PMAO in toluene was added to initiate the reaction which continued under agitation for the indicated time at the indicated temperature. 350 ml of methanol was slowly added to the reaction mixture followed by 5 ml conc. HCl. The white solid polymer was filtered, washed with methanol and dried in vacuo.

Molecular weight was determined by gel permeation chromatography using polyethylene standards. Melting points were determined by employing a DuPont model 912 Differential Scanning Calorimeter by cooling to −100° C., then heating at 10 C°/min to 150° C. In the examples hereinbelow described, the polymers are designated according to Roman numerals I–XVII. The catalysts employed are designated in Table 1 by a letter designation corresponding to the catalysts listed in Table 2. The % of comonomer in the polymer was determined by a combination of proton and $^{13}C$ nuclear magnetic resonance.

TABLE 1

Synthesis of Polymers I–XIV

| Polymer | Catalyst Type | Catalyst Amount (mmols) | n= | Comonomer Amount | Quantity of Solvent (ml) | Reaction Temp (° C.) | Reaction Time (min) | # of Me Per 1000 CH$_2$ | Mole-% comonomer | Mw/Mn ×10$^{-3}$ | m.p. (° C.) |
|---|---|---|---|---|---|---|---|---|---|---|---|
| I | A | 0.017 | 2 | 10 ml | 30 | 0 | 28 | 52 | 1.6 | 289/117 | 106 |
| II | B | 0.017 | 2 | 10 ml | 30 | 0 | 18 | 49 | 4.4 | 186/72 | 94 |
| III | C | 0.017 | 2 | 10 ml | 30 | 0 | 30 | 5 | 3.4 | 122/42 | 125 |
| IV | D | 0.017 | 2 | 10 ml | 30 | 0 | 30 | 11 | 3.7 | 251/49 | 124 |
| V | E | 0.017 | 2 | 10 ml | 30 | 0 | 30 | 6 | 6.9 | 67/25 | 126 |
| VI | F | 0.0141 | 2 | 10 ml | 30 | 0 | 30 | 4 | 5.3 | 26/9 | 126 |
| VII | D | 0.034 | 2 | 10 ml | 70 | 0 | 30 | 20 | 2.6 | 173/35.9 | 118 |
| VIII | D | 0.017 | 2 | 20 ml | 20 | 0 | 105 | 8 | 10.8 | 246/44 | 127 |
| IX | B | 0.017 | 4 | 9.8 g | 30 | 0 | 40 | 77 | 3.9 | 330/141 | 102 |
| X | B | 0.017 | 4 | 3.26 g | 35 | 0 | 45 | 98 | 3.5 | 156/90 | 94 |
| XI | G | 0.1 | 2 | 10.13 g | 50 | 23 | 4260 | 105 | 3.4 | 203/124 | none |
| XII | H | 0.0077 | 2 | 5 g | 35 | 23 | 30 | 3 | 5.7 | 31.6/11.2 | 113 |
| XIII | H | 0.0077 | 2 | 5 g | 35 | 0 | 30 | 2 | 3.4 | 117/52 | 102 |
| XIV | B | 0.035 | 4 | 19.6 g | 60 | 0 | 28 | 81 | 4.6 | 162/67 | 101 |

TABLE 2

Catalysts Employed in the Synthesis of Polymers I–XIV

| CATALYST DESIGNATION | Catalyst |
|---|---|
| A | (structure) |
| B | (structure) |
| C | (structure) |
| D | 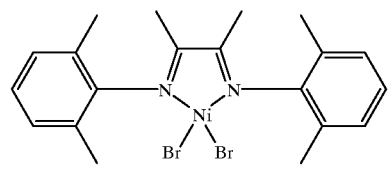 |
| E | 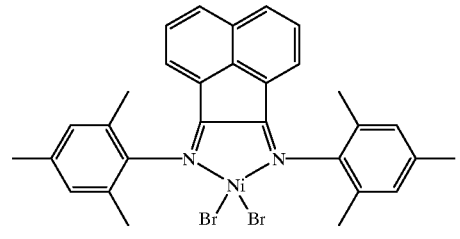 |
| F | 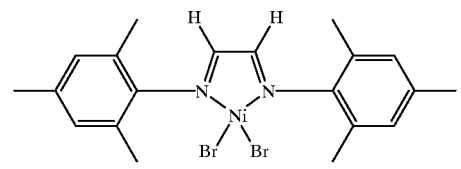 |
| G | Pd(CH$_2$)$_3$C(O)OCH$_3$({2,6-[CH(CH$_3$)$_2$]$_2$C$_6$H$_3$}$_2$DAB(CH$_3$)$_2$)SbF$_6$ |
| H | rac-ethylenebis(indenyl)zirconium (IV) dichloride |

Polymer XV was synthesized by combining in a Schlenk flask in a drybox 2.3 mg (0.0055 mmol) of the catalyst rac-ethylenebis(indenyl)zirconium (IV) dichloride, 2.72 g (7.11 mmol) CH$_2$=CH(CH$_2$)$_4$(CF$_2$)2O(CF$_3$SO$_2$)F and 25 mL toluene. This was placed under 3 psig of propylene in an ice-water bath and was purged with propylene for 10 min. PMAO (7.2 mL 7.1 wt % toluene solution) was added to the mixture. After stirring under 3 psig of propylene at 0° C. for 1 hr, methanol (150 mL) was slowly added to the reaction mixture followed by 5 mL conc. HCl. The white solid polymer was filtered, washed with methanol and dried in vacuo. Copolymer (1.35 g) was obtained. The polymer was isotactic based on $^{13}$C NMR. $^1$H NMR(TCE-d$_2$) indicated a comonomer incorporation of 2.9 mole %. The copolymer exhibits a melting point of 133° C. by differential scanning calorimetry. Gel permeation chromatography (TCB, 135° C., Polyethylene standard): Mw=23,200; Mn=11,000; Mw/Mn=2.1.

Polymer XVI was synthesized by combining in a Schlenk flask in a drybox 2.3 mg (0.0055 mmol) of the catalyst rac-ethylenebis(indenyl)zirconium (IV) dichloride, 5.5 g (0.0144 mol) $CH_2$=$CH(CH_2)_4(CF)O(CF_2)2SO_2F$, and 25 ml toluene. This was placed under 3 psig of propylene in an ice-water bath and was purged with propylene for 10 min. PMAO (4.0 mL 12.9 wt % toluene solution) was added to the mixture. After stirring under 3 psig of propylene at 0° C. for 2 hr, methanol (5 mL) was slowly added to the reaction mixture. The mixture was then poured into 150 mL methanol, followed by 5 mL of conc. HCl. After stirring at room temperature for 20 min, the white solid polymer was filtered, washed with methanol and dried in vacuo. Copolymer (4.6 g) was obtained. The polymer was isotactic based on $^{13}$C NMR. $^1$H NMR(TCE-d$_2$) indicated a comonomer incorporation of 3.8 mole %. The copolymer exhibits a melting point of 124° C. by differential scanning calorimetry. Gel permeation chromatography (TCB, 135° C., Polyethylene standard): Mw=39,200; Mn=20,900; Mw/Mn=1.9.

1. Grafting $CH_2$=$CH(CF_2)_2O(CF_2)_2SO_2F$ on High Density Polyethylene

Polymer XVII was synthesized by combining a solution of 13.03 g of high density polyethylene (Aldrich, Mw=125,000) in 100 ml o-dichlorobenzene at 125° C., with 10.15 g $CH_2$=$CH(CF_2)2O(CF_2)_2SO_2F$ under nitrogen followed by slow addition of a dichlorobenzene solution of tert-butyl peroxide(1.23 g tBuOOtBu in 20 mL 0-dichlorobenzene). Addition was finished in 7 hr. The solution was then allowed to stir overnight. The solution was poured into 500 mL methanol, and blended in a laboratory blender followed by filtration, the steps of methanol dissolution, blending, and filtration being performed a total of four times. The solid polymer was then washed with methanol three times and dried in vacuo. White polymer (21.3 g) was obtained. Based on $^1$H NMR, the mole percentage of comonomer incorporation was 5.4%. Based on NMR branching frequency was 7 Me/1000CH$_2$. GPC(TCB, 135° C., PE standard): Mw=65,700; Mn=4,820; P/D=15.3. The copolymer has a melting point of 118° C. based on DSC.

Films designated F1–F16, F19, F21–F23 of the invention were fabricated from the polymers of the invention.

Polymer VI was found to be excessively brittle to permit further handling, probably because of low molecular weight, and could not be fabricated into a free-standing film. Polymer XI was an oil which could not be fabricated into a free-standing film at room temperature.

All the other polymers hereinabove designated Polymer I-V and Polymer VII-X, and XII-XVII were fabricated into films. Melt-pressed films, designated in Table 3 as "MP", in the range of 3.75 cm×3.75 cm to 7.5 cm×7.5 cm were formed by placing ca. 0.25–5.0 g of the dried polymer between two sheets of Kapton® Polyimide Film available from DuPont, Wilmington, DE, and inserted between the platens of a hydraulic press (model P218C, Pasadena Hydraulic Industries, City of Industry, Calif.) equipped with Omron Electronics Inc. (Schaumburg, Ill.) E5CS temperature controllers. The polymer was preheated for two minutes, followed by compression for two minutes, followed by cooling under pressure. Resulting films ranged in thickness from ca. 63 to 127 micrometers. Specific temperatures and pressures employed are provided in Table 3.

Solution cast films, designated in Table 3 as "soln", were prepared by dissolving 0.25–5.0 g of polymer into the indicated solvent by heating the solvent until the polymer dissolved, followed by casting onto a glass casting tray with 2.5 cm×2.5 cm wells. The solvent was evaporated at room temperature leaving polymer films ranging in thickness from ca. 25–127 micrometers.

TABLE 3

Formation of Polymer Films

| Polymer | FILM SPECIMEN # | Film Conditions |
|---|---|---|
| X | F1 | MP 100° |
|  | F2 | MP 100° |
| IX | F3 | MP 103° C./625 psi/2 min |
|  | F4 | MP 103° C./625 psi/2 min |
| VIII | F5 | SOLN dichlorobenzene |
| III | F6 | SOLN chlorobenzene |
|  | F7 | SOLN chlorobenzene |
| I | F8 | MP |
| IV | F9 | MP |
| II | F10 | MP 240° C./2500 lbs/in$^2$ |
|  | F11 | MP 240° C./2500 lbs/in$^2$ |
| V | F12 | MP 240° C./2500 lbs/in$^2$ |
| VII | F13 | MP 240° C./2500 lbs/in$^2$ |
|  | F14 | MP 240° C./2500 lbs/in$^2$ |
| XII | F15 | MP 140° C./2500 psi |
| XIII | F16 | MP 140° C./2S00 lbs/in$^2$/2 Min |
| XIV | F19 | MP |
| XV | F21 | MP |
| XVI | F22 | MP 160° C./2500 psi/2 min. |
| XVII | F23 |  |

Examples 1–22

Each of the film samples F1–F16, F19, F21–F23 described in Table 3, plus two oil aliquots of polymer XI, were hydrolyzed by treatment with a saturated solution of LiOH in 1:1 water methanol, followed by a soak in 1:1 water methanol, and then heating in a fresh 1:1 water/methanol mixture. Specimens were then dried, except where otherwise specified in a Model 1430 vacuum oven available from VWR Scientific, West Chester, Pa., at a vacuum of at a pressure of ca. 220 torr. Table 4 provides the duration and temperature of film exposure to the LiOH solution, the duration of the room temperature rinse, the temperature and duration of the warm rinse, and the temperature and duration of drying of the hydrolyzed film.

TABLE 4

Hydrolysis/Lithiation of Polymers

| Lithium Ionomer Specimen | FILM SPECIMEN NUMBER | Polymer # | Treatment with LiOH | Rinse Treatment Room Temp (hrs.) | Heated | Drying (° C./days) |
|---|---|---|---|---|---|---|
| S1 | F1 | X | 4 hr. at 50° C. 12 hr. at room temp. | None | 6 hr. at 60° C. | 50/10 |
| S2 | F2 | X | 6 hr. at 50° C. | 12 | 4 hr. at 50° C. | 50/5 |
| S3 | F3 | IX | 6 hr. at 60° C. | 12 (water only) | 6 hr at 60° C. | 50/3 |
| S4 | F4 | IX | 6 hr. at 65° C. | 12 | 4 hr. at 65° C. | 50/5 |
| SS | F5 | VIII | 6 hr. at 60° C. | 48 | 4 hr. at 60° C. | 50/8 |
| S6 | F6 | III | 6 hr. at 65° C. | 48 | 4 hr. at 60° C. | 50/7 |
| S7 | P7 | III | 2 hr. at 60° C. | 48 | 4 hr. at 60° C. | 50/7 |
| S8 | F8 | I | 8 hr. at 45° C. 12 hr. at room temp. | 24 | 4 hr. at 45° C. | Rm. T/6 |
| S9 | F9 | IV | 6 hr. at 65° C. | 12 | 4 hr. at 65° C. | Rm. T/3 50/3 |
| S10 | F10 | II | 6 hr. at 60° C. | 12 | 4 hr. at 60° C. | 50/8 |
| S11 | F11 | II | 6 hr. at 60° C. | 48 | 4 hr. at 60° C. | 55/10 |
| S12 | F12 | V | 6 hr. at 60° C. | 12 | 2 hr. at 60° C. 2 hr. at 60° C. in water | Rm. T/6 50/5 |
| S13 | F13 | VII | 6 hr. at 70° C. | 12 | 4 hr. at 60° C. | 50/12 |
| S14 | F14 | VII | 6 hr. at 70° C. | 72 | 4 hr. at 70° C. | 55110 |
| S15 | F15 | XII | 6 hr. at 65° C. | 12 | 4 hr. at 65° C. | 50/8 |
| S16 | F16 | XIII | 6 hr. at 65° C. | 12 | 4 hr. at 65° C. | 50/6 |
| S17 | F17 | XI | 6 hr. at 80° C. 12 hr. at room temp. 2 hr. at 80° C. | | * | none |
| S18 | F18 | XI | 6.5 hr. at 80° C. 12 hr. at room temp. 4.5 hr. at 80° C. | | ** | 70/2 |
| S19 | F19 | XIV | 6 hr. at 70° C. | 48 | 4 hr. at 70° C. | 55/12 |
| S21 | F21 | XV | 6 hr. at 70° C. 12 hr. at room temp. | none | 4 hr. at 70° C. | 55/11 |
| S22 | F22 | XVI | 6 hr. at 80° C. | 12 | 4 hr. at 80° C. | 65/12 |
| S23 | F23 | XVII | 2.0 g Li OH in 2/15/100 H₂O/DMSO/ MeOH 60° C./8 hours followed by 14 hours at RT. | | H₂O/MeOH wash. CONDITIONS? | 50/1 |

* dialysis against water for 7 days in dialysis tubing with MWCO = 3500
** dialysis against water for 12 days in dialysis tubing with MWCO = 3500

Example 23

A 4.43 g sample of Polymer XIV in the form of as-polymerized polymer crumb formed as described in Example XIV, was subject to hydrolysis by immersing for two hours into an excess of a saturated solution of LiOH in a 1:1 water/methanol mixture preheated to 70° C., followed by heating to 75° C. and holding for an additional two hours, followed in turn by cooling to room temperature and holding for 12 hours, and followed by heating to 75° C. again, and holding for 4 hours. The resulting hydrolyzed polymer was then subject to a 12 hour rinse at room temperature in a 1:1 mixture of water/methanol, followed by a 4 hour rinse at 80° C. in a fresh mixture of 1:1 water/methanol followed by a 12 hour rinse at room temperature in a 1:1 mixture of water/methanol.

The hydrolyzed polymer was then dissolved in THF and cast into a film by casting onto a glass plate, followed by evaporation of the THF, and separation of the film from the plate. The hydolyzed film so formed is designated hereinbelow as specimen S20.

Example 24

0.2817 g of lithiated polymer sample S19 prepared as hereinabove described was placed in 10 mL of THF and warmed gently until dissolved. 0.056 g of Cabot Cab-o-sil® TS530 was added and stirred until dispersed. The dispersion was cast into a round petri dish of Teflon® PFA, 50 mm in diameter, and the solvent was allowed to evaporate to form the hydrolyzed film designated hereinbelow as specimen S24.

Examples 25–181

The dried hydrolyzed films of Examples 1–24, S1–S24, were transferred to a sealed container while still warm and conveyed to a glove box having a positive pressure of dry nitrogen applied thereto, wherein the membrane was removed from the sealed container and allowed to come to room temperature. Still in the glove box, the membrane was then cut into several sections 1.0 cm by 1.5 cm in size. Typically, the specimens as prepared were then heated at 100° C. under vacuum for 24–48 hours.

A cooled 1.0 cm by 1.5 cm membrane sample was then soaked in an excess of one or more liquids in a sealed glass vial for 24 hours at room temperature. The liquids employed are all commercially available, and were used as received. Following immersion, the membrane sample was removed from the liquid bath, blotted with a paper towel to remove excess liquid, and tested.

Ionic conductivity was determined using the so-called four-point probe technique described in an article entitled "Proton Conductivity of Nafion® 117 As Measured by a Four-Electrode AC Impendance Method" by Y. Sone et al., J. Electrochem. Soc., 143,1254 (1996). The method as described applies to aqueous electrolyte membranes. The method was modified for purposes of obtaining the measurements reported herein for non-aqueous solvents by placing the apparatus described in a sealed glove box purged with dry nitrogen in order to minimize any exposure to water. The method was also modified by substituting parallel linear probes traversing the full width of the test specimen for the point probes employed in the published method.

A 1.0 cm by 1.5 cm film was blotted dry and positioned into the conductivity cell. Cell impedance was determined over the range of 10 Hz to 100,000 Hz, and the value with zero phase angle in the higher frequency range (usually 500–5000 Hz) was ascribed to the bulk sample resistance in Ohms. The raw resistance value was then converted to conductivity, in S/cm, using the cell constant and liquid-swollen film thickness.

The following abbreviations have been used:

DEC diethyl carbonate
DEE diethoxyethane
DMC dimethyl carbonate
DME 1,2-dimethoxyethane
DMF N,N'-dimethyl formamide
DMSO dimethyl sulfoxide
EC ethylene carbonate (1,3-dioxolan-2-one)
GBL γ-butyrolactone
MA methyl acetate
MeOH methanol
MG methyl glycolate
NMF N-methyl formamide
NMP N-methyl pyrrolidone
PC propylene carbonate
PEG poly(ethylene glycol)
THF tetrahydrofuran Examples 25–138

In the conductivity tests so performed, wherein hydrolyzed films of the invention, S1–S24, were combined with the liquids indicated to form conductive compositions of the invention, as described the compositions shown in Table 5 were found to exhibit room temperature ionic conductivity greater than $10^{-5}$ S/cm.

TABLE 5

Examples 25–138. Ionically Conductive Compositions Formed by Combining Liquid and Film Which Exhibited Conductivity Greater Than $10^{-5}$ S/cm

| Hydrolyzed Film Specimen | Liquids Imbibed |
| --- | --- |
| S2 | PC/DME; EC/DME |
| S4 | PC/DME; EC/DME; PC; DMSO; DMF |
| S9 | PC; PC/DMC; PC/DME; EC/PC; EC/DMC; EC/DME |
| S10 | PC; EC/DME; DMSO; DMC; THF; PC/DME; PC/DMSO; PC/DMC |
| S11 | PC/DEC; EC/DMC; EC/PC; NMF; DME; PC; DME; EC/PC/DMC |
| S12 | PC; DME; GBL; DEE; PC/DME; GBL/DMSO; PC/DEE |
| S13 | PC; EC/DME; DMSO; DMF; GBL; PC/DMSO; PC/GBL |
| S14 | PC/DEC; EC/DMC; EC/PC; NMF; DME; PC; DME; EC/PC/DMC |
| *S15 | PC; DME; GBL; DMF; DMSO; EC/DME; PC/EC; PC/DME; PC/GBL; PC/DMF; PC/DMSO; EC/PC/DME |
| S16 | PC; DME; DMSO; DMF; DEC; GBL; NMP; MG; PC/DME; PEG/DME; PC/DMSO; PC/DMF; PC/GBL; THF/GBL; NMP/DMF; MA/GBL; MG/DMSO; EC/DMC; EC/DME |
| S19 | DMSO; DMF; GBL |
| S20 | PC; EC/DMC; EC/PC/DMC |
| S21 | DMSO; DMF; GBL |
| S22 | DME; EC/DMC; DMSO; GBL; DMF |
| S23 | PC; DMSO; PC/DME |
| S24 | EC/DMC; GBL; DMSO; EC/PC/DMC; EC/DMC/GBL; EC/DMC/DMSO |

It was observed that the specimens of S15 employed in the examples hereinabove described retained their physical integrity to a particularly high degree while immersed in the numerous solvents listed in Table 11.

Examples 139–140

Specimens of each of hydrolyzed film samples S2, S4, S5, S6, and S7 were soaked in PC according to the method hereinabove described except that the period of exposure was either 2 hours or 54 hours, as indicated in Table 6.

TABLE 6

Ionic Conductivity of Hydrolyzed Films in PC at Room Temperature

| | 6 hrs. | 54 hrs |
| --- | --- | --- |
| S2 | $3.91 \times 10^{-5}$ | $9.8 \times 10^{-5}$ |
| S5 | $2.06 \times 10^{-4}$ | $1.89 \times 10^{-4}$ |
| S5 | mush | $-3.4 \times 10^{-4}$ |
| S6 | $2.34 \times 10^{-4}$ | $2.82 \times 10^{-4}$ |
| S7 | $1.61 \times 10^{-4}$ | $2.2 \times 10^{-4}$ |
| S4 | $2.12 \times 10^{-4}$ | $2.86 \times 10^{-4}$ |

Examples 141–150

The polymeric oil formed by hydrolysis of Polymer XI was mixed with the solvents indicated in Table 22 to form gels at the temperatures indicated. Conductivity measurements were made using an Orien liquid immersion conductivity probe. Results are shown in Table 7.

TABLE 7

Ionic conductivities of gel solutions of Polymer XI

| Solvent Mixture | Conc. (M) | Temperature (° C.) | Ionic Conductivity (S/cm) |
|---|---|---|---|
| PC | 0.00375 | 55 | 2.42 × 10⁻⁵ |
| PC/DME | 0.00375 | 55 | 6.12 × 10⁻⁵ |
| PC/DME | 0.0375 | 55 | 2.93 × 10⁻⁴ |
| PC/DME/DMF | 0.00341 | 55 | 3.60 × 10⁻⁵ |
| PC/DME/DMF | 0.01875 | 55 | 2.37 × 10⁻⁴ |
| DMF | 0.025 | 29 | 4.48 × 10⁻⁴ |
| DMF | 0.025 | 35 | 4.60 × 10⁻⁴ |
| DMF | 0.025 | 40 | 4.90 × 10⁻⁴ |
| DMF | 0.025 | 55 | 5.70 × 10⁻⁴ |
| DMF | 0.025 | 75 | 6.40 × 10⁻⁴ |

Examples 150–173

Specimens of the hydrolyzed films indicated in Table 23 were evaluated for conductivity in an aqueous medium both in the lithiated form prepared as hereinabove described, and in the acid form. The acid form membranes were prepared from the lithium-form membranes by immersing the membrane into an excess of 1.0 M nitric acid (Reagent grade, EM Science, Gibbstown, N.J.) for one hour, followed by rinsing at T=80° C. in deionized water cooling in deionized water.

The films were then treated by immersion into deionized water and heating to T=80° C. for two hours, followed by cooling at room temperature. Conductivity was measured using the same procedures as above except all measurements were done outside of the glove box.

TABLE 8

Ionic conductivities of copolymers of ethylene and fluorosulfonate monomers in Li⁺ and H⁺-form equilibrated with liquid deionized water at room temperature

| | Ionic Conductivity (S/cm) | |
|---|---|---|
| Sample | H⁺ form | Li⁺ Form |
| S8 | <3.0 × 10⁻⁷ | 0.000435 |
| S9 | 0.0336 | 0.00531 |
| S2 | 0.00064 | 7.06 × 10⁻⁵ |
| S4 | 0.0401 | 0.00746 |
| S13 | 0.0227 | 0.00490 |
| S10 | 0.0560 | 0.0112 |
| S15 | 0.0361 | 0.01002 |
| S16 | 0.01455 | 0.00164 |
| S11 | 0.0420 | 0.00859 |
| S14 | 0.0348 | 0.00651 |
| S24 | 0.0297 | 0.00757 |
| S23 | 0.0648 | 0.0116 |

Example 174

Polymer IX synthesized as hereinabove disclosed is reacted with $CF_3CF_2SO_2NNaSi(CH_3)_3$ according to the method taught in Desmarteau, J.

Fluorine Chem. 5, pp 7ff(1991) which is herein incorporated by reference. The polymer thus formed is treated with $H_2SO_4$ excess 30% at room temperature for 6 hours to form the Na imide polymer. The Na imide polymer thus formed is then readily ion-exchanged in a large excess of 0.1M LiOH in a 50/50 water methanol solution at room temperature for 5 hours. The resulting ionomer is a polymer having a substantially unsubstituted ethylene backbone and 3.9 mol-% of a pendant group comprising a radical of the formula:

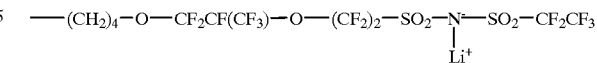

The Li imide ionomer is confirmed by NMR and elementary analysis.

Example 175

$(CF_3CF_2'SO_2)_2C(BrMg)_2$ is synthesized from $CH_2(SO_2CF_2CF_3)_2$ and $CH_3MgBr$ according to the method of Seppelt, Inorg. Chem. 27, pp. 2135ff (1988). To a stirred THF solution of Polymer IX synthesized as hereinabove disclosed is added $(CF_3CF_2'SO_2)_2C(BrMg)_2$ at 0° C. After the addition is complete, the reaction mixture is stirred at R.T overnight. The THF is then pumped off, 3M HCL is added, the solution is stirred for several hours and filtered. The solid is washed with water to remove inorganic salts and then treated with 0.1M LiCl in 50/50 water/MeOH at room temperature overnight. $R_fSO_2C(Li)(SO_2CF_3)_2$ was obtained.

The resulting ionomer is a polymer having a substantially unsubstituted polyethylene backbone and 3.9 mol-% of a pendant group comprising a radical of the formula:

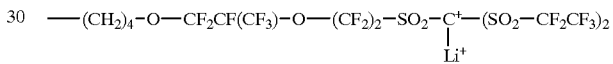

The Li methide ionomer is confirmed by NMR and elementary analysis.

Example 176

A dried 0.5 g sample of the hydrolyzed polymer of Example 23 was placed in a sealed flask with 12 g of tetrahydrofuran (THF) and stirred at 400 rpm and a temperature of 65° C. for 4 hr. Fumed silica (0.125 g of TS530, Cabot Corp., Boston, Mass.) was added and the stirring continued for several minutes to disperse the silica. The suspension was filtered through a plug of glass wool to remove any gel particles, and cast on to Mylar™ polyester film, available from DuPont, with a doctor blade having a 0.050" gate height. The THF was allowed to evaporate at ambient temperature, yielding a film of 32 to 40μ thickness. The film so produced was employed as the separator film in the battery construction hereinbelow described.

A second sample of the hydrolyzed polymer of Example 23 was employed in the formation of the anode employed in the battery hereinbelow described: 0.2 g of the dried ionomer was placed in a sealed flask with 7 g of tetrahydrofuiran and stirred at 400 rpm at a temperature of 70° C. for 2 hr. Carbon black (0.05 g, SP black, MMM S.A. Carbon, Brussels, Belgium) and graphite (0.75 g of mesophase carbon micro beads MCMB 25-28, Osaka Gas, Japan) were added and the mixture stirred for another 15 minutes. The slurry was cast on to silanized Mylar® available from DuPont and the THF allowed to evaporate at ambient temperature.

A round 12 mm dia. electrode was punched from the graphite film and dried under vacuum at 100° C., giving a mass of 11.6 mg (8.7 mg of graphite) and a thickness of 160μ. A separator (11.5 mg mass, 43μ thick and, and 19 mm dia. round) was punched from the separator film from above. These were soaked in excess anhydrous EC/DMC for 10 min, absorbing 21.8 mg of liquids. They were assembled with a lithium foil cathode into a size 2325 coin cell. The cell was discharged with constant current of 0.5 mA to a voltage of 0.01 V, at which point the voltage was held constant until the current dropped below 0.05 mA. The capacity on first discharge was 2.42 mAh, corresponding to 280 mAh per g of graphite positive electrode material. The cell was charged at a 0.5 mA rate to 1.2 V, and then the voltage was held constant at 1.2 V until the charging current dropped below 0.05 mA. The charge capacity was 1.97 mAh, indicating an electrochemical efficiency of 81% in the first discharge/charge cycle. The cell was repeatedly discharged and charged in a manner similar to above, with the 14th discharge capacity being 1.85 mAh.

What is claimed is:

1. An ionically conductive composition comprising a liquid imbibed within an ionomer comprising a backbone and pendant groups, the backbone consisting essentially of methylene and methine units and the pendant groups comprising ionic radicals of the formula $$-R_f-CF_2CF_2-SO_2-X-(SO_2R_f)_a^- M^+$$

where $M^+$ is a univalent metal cation; the $R_f$ groups are independently selected from the group consisting of linear or branched perfluoroalkylene radicals, perfluoroalkylene radicals containing O or Cl, and perfluoroaryl radicals; R is hydrocarbyl; a=0–2; and X=O, N or C; said ionic radicals being further limited in that a=0 when X=O, a=when X=N, and a=2 when X=C.

2. The ionically conductive composition of claim 1 wherein the liquid is water or methanol.

3. The ionically conductive composition of claim 1 wherein the liquid is aprotic.

4. The ionically conductive composition of claim 3 wherein the liquid is selected from the group consisting of organic carbonates and mixtures thereof.

5. The ionically conductive composition of claim 4 wherein the liquid is a mixture of ethylene carbonate and at least one liquid selected from the group consisting of dimethyl carbonate, methyl ethyl carbonate and diethyl carbonate.

6. The ionically conductive composition of claim 1 wherein $M^+$ is a lithium cation, $R=(CH_2)_4$, $R_f=(CF_2)_2$ or 4, X=O, a=0, the concentration of said ionic radicals is 2–10 mol-%, further comprising up to 150 short chain branches per 1000 methylene units in the backbone, and the liquid is selected from the group consisting of organic carbonates and mixtures thereof.

7. The ionically conductive composition of claim 1 in a form selected from the group consisting of a film, sheet and gel.

8. The ionically conductive composition of claim 6 in a form selected from the group consisting of a film, sheet and gel.

9. The ionically conductive composition of claim 7 further comprising a microporous electrically insulating polymer film or sheet within the micropores of which the gel is imbibed.

10. The ionically conductive composition of claim 8 further comprising a microporous electrically insulating polymer film or sheet within the micropores of which the gel is imbibed.

11. An electrode comprising at least one electrode active material and the conductive composition of claim 1.

12. The electrode of claim 11 wherein $M^+$ is a lithium cation, $R=(CH_2)_4$, $R_f=(CF_2)_2$ or 4, X=O, a=0, the concentration of said ionic radicals is 2–10 mol-%, further comprising up to 150 short chain branches per 1000 methylene units in the backbone, and the liquid is selected from the group consisting of organic carbonates and mixtures thereof.

13. The electrode of claim 12 further comprising carbon black.

14. The electrode of claim 13 wherein the weight ratio of ionomer to electrode active material is between 0.05 and 0.8 and the weight ratio of carbon black to electrode active material is between 0.01 and 0.2.

15. An electrochemical cell comprising a positive electrode, a negative electrode, a separator disposed between the positive and negative electrodes, and a means for connecting the cell to an outside load or source wherein at least one of the group consisting of the separator, the cathode, and the anode, comprises an ionomer comprising a backbone and pendant groups, the backbone consisting essentially of methylene and methine units and the pendant groups comprising ionic radicals of the formula $$-R-R_f-CF_2CF_2-SO_2-X-(SO_2R_f)_a^- M^+$$

where $M^+$ is a univalent metal cation; the $R_f$ groups are independently selected from the group consisting of linear or branched perfluoroalkylene radicals, perfluoroalkylene radicals containing O or Cl, and perfluoroaryl radicals; R is hydrocarbyl; a=0–2; and X=O, N or C; said ionic radicals being further limited in that a=0 when X=O, a=1 when X=N, and a=2 when X=C.

16. The electrochemical cell of claim 15 further comprising a liquid.

* * * * *